United States Patent
Schultheiss

(10) Patent No.: US 9,394,475 B2
(45) Date of Patent: Jul. 19, 2016

(54) MULTI-COMPONENT MATERIALS FOR BREAKER ACTIVITY CONTROL

(71) Applicant: HALLIBURTON ENERGY SERVICES, INC., Houston, TX (US)

(72) Inventor: Nathan Carl Schultheiss, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/387,669

(22) PCT Filed: Aug. 9, 2013

(86) PCT No.: PCT/US2013/054297
§ 371 (c)(1),
(2) Date: Sep. 24, 2014

(87) PCT Pub. No.: WO2015/020670
PCT Pub. Date: Feb. 12, 2015

(65) Prior Publication Data
US 2015/0376494 A1 Dec. 31, 2015

(51) Int. Cl.
*E21B 43/267* (2006.01)
*C09K 8/68* (2006.01)
*C09K 8/70* (2006.01)
*C09K 8/88* (2006.01)
*E21B 43/04* (2006.01)
*C09K 8/90* (2006.01)
(Continued)

(52) U.S. Cl.
CPC . *C09K 8/685* (2013.01); *C09K 8/68* (2013.01); *C09K 8/706* (2013.01); *C09K 8/80* (2013.01); *C09K 8/88* (2013.01); *C09K 8/887* (2013.01); *C09K 8/90* (2013.01); *E21B 43/04* (2013.01); *E21B 43/26* (2013.01); *E21B 43/267* (2013.01); *C09K 2208/24* (2013.01); *C09K 2208/26* (2013.01)

(58) Field of Classification Search
CPC .............. C09K 8/72; C09K 8/74; C09K 8/62; C09K 8/68; C09K 8/70; C09K 8/76; C09K 8/78; C09K 8/665; C09K 8/685; C09K 8/80; C09K 8/92; E21B 43/26; E21B 43/16; E21B 43/25
See application file for complete search history.

(56) References Cited

U.S. PATENT DOCUMENTS 4,961,466 A * 10/1990 Himes ...................... C09K 8/62 166/308.5
7,748,456 B2 7/2010 Pauls et al.
(Continued)

OTHER PUBLICATIONS

Bethune et al., "Improving the Poor Aqueous Solubility of Nutraceutical Compound Pterostilbene through Cocrystal Formation", Crystal Growth & Design, vol. 11, No. 7, 2011, pp. 2817-2823.
(Continued)

*Primary Examiner* — Zakiya W Bates
(74) *Attorney, Agent, or Firm* — Kilpatrick Townsend & Stockton LLP

(57) ABSTRACT

A multicomponent material can be used to treat subterranean formations. The multicomponent material can be a cocrystal that includes a breaker cocrystallized with another molecule for modifying a solubility profile of the breaker. Cocrystallazing the breaker with another molecule provides control over the rate at which the breaker dissolves in a treating fluid so the breaker will dissolve and become active at an optimum time or under optimum conditions.

17 Claims, 1 Drawing Sheet

(51) Int. Cl.
*C09K 8/80* (2006.01)
*E21B 43/26* (2006.01)

(56) References Cited

U.S. PATENT DOCUMENTS

| | | |
|---|---|---|
| 7,989,400 B2 | 8/2011 | Pauls et al. |
| 8,318,807 B2 | 11/2012 | Schultheiss et al. |
| 8,350,085 B2 | 1/2013 | Childs |
| 8,361,935 B2 | 1/2013 | Abad et al. |
| 2005/0261138 A1 | 11/2005 | Robb et al. |
| 2008/0300150 A1* | 12/2008 | Reddy ............... C04B 24/38 507/111 |
| 2013/0112413 A1 | 5/2013 | Muthusamy et al. |

OTHER PUBLICATIONS

Rodriguez-Hornedo, "Cocrystals: The Future of Improving Solubility?", University of Michigan, Department of Pharmaceutical Sciences, 2011, 34 pages.

International Patent Application No. PCT/US2013/054297, "International Search Report and Written Opinion" mailed May 19, 2014, 9 pages.

* cited by examiner

MULTI-COMPONENT MATERIALS FOR BREAKER ACTIVITY CONTROL

CROSS-REFERENCE TO RELATED APPLICATIONS

This is a U.S. national phase under 35 U.S.C. 371 of International Patent Application No. PCT/US2013/054297, titled "Multi-Component Materials for Breaker Activity Control," filed Aug. 9, 2013, the entirety of which is incorporated herein by reference.

TECHNICAL FIELD

This application relates to methods and compositions for treating subterranean formations. More particularly, the application relates to novel breakers and use of same for reducing the viscosity of fracturing gels.

BACKGROUND

Viscous fluids are used in a variety of operations and treatments in oil and gas wells. Such operations and treatments include forming gravel packs in well bores, fracturing producing zones, performing permeability control treatments and the like. Hydrocarbon producing wells are often stimulated by hydraulic fracturing treatments. In hydraulic fracturing, a viscous fracturing fluid is pumped into a subterranean formation at a rate and pressure such that one or more fractures are formed or enhanced in the formation. After the fractures are formed or enhanced, the fluid viscosity is reduced and the fluid is removed from the formation. In some cases, the fracturing fluid also functions as a carrier fluid, carrying proppant particles, e.g. graded sand, into the fractures. The proppant particles are suspended in the fracturing fluid and are deposited in the fractures when the fracturing fluid viscosity is reduced. More viscous fracturing fluids can more effectively form or extend fractures and carry proppant particles.

Fracturing fluids typically are made viscous by use of polymeric materials. Generally, the more polymer that is used, the more viscous the fluid will become. For example, polymers such as cellulose, guar, and their derivatives have been used to form aqueous gel treating fluids having viscosities on the order of 1000's of centipoise. Gels made with linear polymers sometimes have sufficient viscosity to create fractures in some rock formations. For other formations, however, more viscous gels and/or gels with more internal structure are desirable. The polymeric material may be crosslinked to increase viscosity and build internal structure. The internal structure created by crosslinking is important because for at least some formations the fluid must be able to carry proppant, e.g. sand particles, into the fractures. Without internal structure proppant may settle out of the fluid even if the fluid is very viscous.

Fracturing fluids often include breakers for reducing the viscosity of the fluid after the fluid has effected fractures and/or positioned proppant particles. Breakers degrade polymers in the treating fluid, thus breaking the gel and reducing the fluid's viscosity. Breaking the gel converts the viscous fluid into a more free flowing fluid, which can be removed from the formation more easily than a viscous fluid. The thinned fluid also allows oil and/or natural gas to more freely flow out of the formation. Thinning the fluid also reduces the likelihood that the polymer will contribute to an oil/water emulsion. Unbroken polymer can stabilize emulsions of oil and water, which causes problems when the oil is extracted. The thinned fluid also leaves proppant particles in fractures where they function to prevent the fractures from closing and help to form conductive channels through which hydrocarbons and/or natural gas readily can flow.

Known breakers may be liquids or solids, and include, but are not limited to, chemical oxidizers, enzymes, and acids. Breakers are formulated to remain inactive while the treating fluid is introduced to the subterranean formation and until a reduction in viscosity is desired. The breaker may be formulated to be "activated" by certain conditions in the fluid (e.g., pH, temperature, etc.) and/or by interaction with some other substance. Alternatively, the breaker may be encapsulated with a coating that delays release of the breaker. Typically liquid breakers are activated by temperature or time delay. Another method of controlling breaker activity is by loading concentration of the breaker.

Treating fluids generally are water based. Materials soluble in water can be used as breakers if their solubility profile is such that they dissolve and thereby become active to break the gel at the time when a reduction in viscosity is desired and not before that time. If a material dissolves too slowly, it could not be used as a breaker. If a material in its native state dissolves too quickly it sometimes can be coated to delay its dissolution and thereby delay the reduction in viscosity until the appropriate time.

Known methods of controlling breaker activity have limitations. For example, coating is not a viable option for some materials, such as sodium persulfate, because the coated material has particle sizes that are not uniform. Moreover, encapsulated products often do not have a uniform distribution of coating, which leads to inconsistent break profiles. Decreasing the loading concentration of the breaker to delay breaker activity could lead to insufficient concentrations to fully break the treating liquid.

It would be advantageous to provide breakers soluble in a treating fluid, where the breakers have solubility profiles suitable for breaking the viscosity of a treating fluid only at the desired time, and where the breakers do not require a coating.

DETAILED DESCRIPTION

Compositions described herein are useful as fluids for treating subterranean formations. In some embodiments described herein, the compositions are useful as fracturing fluids to enhance production of oil and natural gas from subterranean formations by creating and/or enhancing one or more fractures in the formations. The compositions include polymeric gels and breakers, where the breakers are components of multicomponent materials. The multicomponent materials described herein include breakers cocrystallized with another molecule. The cocrystallization modifies a physical property of the component materials, such as solubility profile.

As used herein, the terms "treat," "treatment," and "treating" refer to any subterranean operation that uses a fluid in conjunction with a desired function and/or for a desired purpose. The terms "treat," "treatment," and "treating," as used herein, do not imply any particular action by the fluid or any particular component thereof.

"Enhancing" one or more fractures in a subterranean formation, as that term is used herein, is defined to include the extension or enlargement of one or more natural or previously created fractures in the subterranean formation.

A cocrystal is a crystal formed from two or more nonidentical molecules, called coformers. Cocrystals often include at least one molecule that has some desired property, such as activity as a drug. That molecule may be referred to as the active agent or host. The cocrystal further includes one or more other molecules chemically distinct from the active agent, or host, which may also have some desired activity or may be inert. The one or more other molecules typically are referred to as coformers or guests. If a coformer has independent activity it may also be referred to as an active agent. For example, cocrystallization is used in the pharmaceutical industry to modify properties of drugs such as solubility, bioavailability, toxicity, taste, physical and chemical stability, and other properties. In that case, the drug is the active agent (or host) and is cocrystallized with another compound, i.e., a coformer (or guest).

Cocrystals have not previously been used in fluids for fracturing subterranean formations. Herein are described novel multicomponent materials for use in fracturing fluids, where the multicomponent materials include breakers, and where the multicomponent materials have solubility profiles modified as compared to their constituent compounds. The solubility profiles of the multicomponent materials are such that they dissolve, and the breakers become active, at a time during a fracturing operation when a reduction in viscosity is desired.

Figure 1:
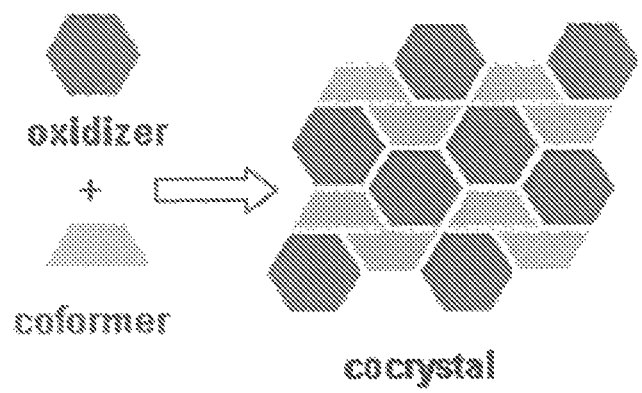
FIG. 1 is a schematic diagram of a cocrystal including a breaker and a coformer.
Figure 2:
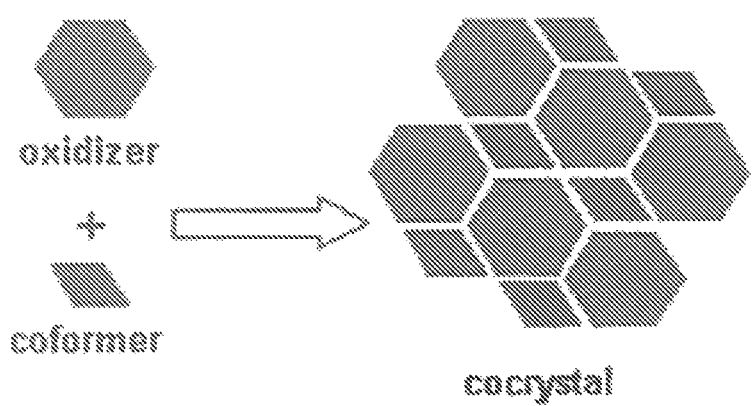
FIG. 2 is a schematic diagram of a cocrystal including a breaker and a coformer.

In the multicomponent materials described herein, the active agent is a breaker. The breaker may be cocrystallized with one or more coformers. A coformer may be inert, may itself be a breaker, or may have some other property useful in a fracturing operation. In some embodiments, the breakers described herein become active for breaking a polymer used in a fracturing fluid upon dissolution in the fracturing fluid. In some embodiments the breakers described herein are water soluble and the fracturing fluid is aqueous. FIGS. 1 and 2 are schematic diagrams illustrating a breaker that is an oxidizer cocrystallized with two different coformers.

In some embodiments, cocrystallizing the breaker modifies the solubility profile of the breaker. In some embodiments, the cocrystal dissolves more quickly or more slowly than the breaker in its native state. Such a modification to the solubility profile may allow use of breakers that previously could not be used, or could not be used without a coating, because they dissolve, and thus activate, too quickly or too slowly. If a breaker dissolves and becomes active too quickly, the polymer in the fracturing fluid may break before the fracturing operation is complete and/or before proppant is placed in the fractures. If a breaker dissolves and becomes active too slowly, the oil from the formation may mix with the thick aqueous fluid, forming an oil/water emulsion. Cocrystallization provides control over the rate at which the breaker dissolves in a treating fluid so the breaker will dissolve and become active at the optimum time and/or under the optimum conditions.

The multicomponent materials described herein may include any breaker known and used in fracturing operations that can be cocrystallized. Chemicals such as oxidizers, enzymes, and acids typically are used as breakers and may be included in the cocrystals disclosed herein. The compositions described herein also may include molecules not previously available for use as breakers due to solubility characteristics inappropriate for use as a breaker. Suitable breakers for the cocrystals described herein include, but are not limited to oxidizers, enzymes, acids, and equivalents thereof. Preferred breakers include perfluorate salts, perborate salts, perchlorate salts, and equivalents thereof. In some embodiments, the breaker includes sodium persulfate or ammonium persulfate.

The breakers may be cocrystallized with a coformer, such as an inert coformer, another breaker, or a molecule having some other property useful in a fracturing operation. Suitable coformers include molecules having aromatic or aliphatic carboxylic acid, amine, amide, or nitrile functional groups or equivalents thereof. In certain compositions described herein, the breaker may be present in the treating fluid in an amount of 0.1 pounds per thousand gallons to 10 pounds per thousand gallons.

Treating fluids described herein generally may include any polymer known and used in fracturing operations, but are not limited to such polymers. Preferred polymers are polysaccharides and their derivatives, including but not limited to cellulose, guar, chitosan, xanthan, and their derivatives. Suitable polysaccharides also include the glycosaminoglycans (mucopolysaccharides), such as hyaluronic acid, and their derivatives. The polymers may be used in combination as copolymers or blends. Preferably, the polymers are gels and in some embodiments are crosslinked. The polymer may be present in the treating fluid in an amount of 5 pounds per thousand gallons to 60 pounds per thousand gallons.

In some embodiments, a composition for treating a subterranean formation includes a polymer and a cocrystal, and the cocrystal includes at least one breaker and at least one coformer. In some embodiments, the at least one coformer is also a breaker. In some embodiments, the at least one coformer is inert or has some other property advantageous for the treating fluid. In some embodiments, the cocrystal includes any breaker described herein, or equivalent thereof, cocrystallized with any coformer described herein, or equivalent thereof. In some embodiments, the breaker is a persulfate salt, a perborate salt, a perchlorate salt, or an equivalent thereof. In some embodiments, the breaker is sodium persulfate, ammonium persulfate, or sodium perborate. In some embodiments, the coformer is a molecule having a functional group selected from the group consisting of aromatic or aliphatic carboxylic acids, amines, amides, and nitriles. In some embodiments, the cocrystal is soluble in the treating fluid. In some embodiments, the treating fluid is aqueous.

In some embodiments, the polymer in the treating fluid is, or includes, a polysaccharide or equivalent thereof. In some embodiments, the polysaccharide is cellulose, guar gum, chitosan, hyaluronic acid, xanthan, derivatives thereof, or equivalents thereof. The polymer may be a copolymer or blend. In some embodiments, the polymer is crosslinked.

The treating fluid may also include a crosslinking agent, among other purposes, to further enhance the viscosity of the treating fluid. The term "crosslinking agent" is defined herein to include any molecule, atom, or ion that is capable of forming one or more crosslinks between molecules of a polymer and/or between one or more atoms in a single molecule of a polymer. The crosslinking agent may include a borate, a metal ion, or similar component that is capable of crosslinking at least two molecules of the sulfonated gelling agent polymer(s). Examples of suitable crosslinking agents that can be utilized include, but are not limited to the following: boron compounds such as boric acid, disodium octaborate tetrahydrate, sodium diborate and pentaborates; ulexite; colemanite; compounds that can supply zirconium IV ions such as zirconium lactate, zirconium lactate triethanolamine, zirconium carbonate, zirconium acetylacetonate and zirconium diisopropylamine lactate; compounds that can supply titanium IV ions such as titanium ammonium lactate, titanium triethanolamine and titanium acetylacetonate; aluminum compounds such as aluminum lactate and aluminum citrate; and compounds that can supply antimony ions. In certain embodiments, the crosslinking agent may be formulated to remain inactive until it is "activated" by, among other things, certain conditions in the fluid (e.g., pH, temperature, etc.) and/or interaction with some other substance. In some embodiments, the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the following: the type of gelling agent included, the molecular weight of the gelling agent(s), the conditions in the subterranean formation being treated, the safety handling requirements, the pH of the treating fluid, temperature, and/or the desired delay for the crosslinking agent to crosslink the gelling agent molecules.

In certain embodiments, a crosslinking agent may be included in the treating fluid in an amount in the range of from about 5 pounds per gallon to about 60 pounds per 1000 gallon of the treating fluid. In certain embodiments, a crosslinking agent may be included in the treating fluid in an amount in the range of from about 0.1 pounds per 1000 gallons to about 5 pounds per 1000 gallons of the treating fluid.

The treating fluids described herein optionally may include a plurality of particulates, such as proppant particulates or gravel particulates. Particulates suitable for use in the disclosed compositions may include any material suitable for use in subterranean operations. Suitable materials for these particulates include, but are not limited to, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may include a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for use in the disclosed compositions. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the disclosed compositions. In certain embodiments, the particulates included in the compositions described herein may be coated with any suitable resin or tackifying agent known to those of ordinary skill in the art. In certain embodiments, the particulates may be present in the compositions described herein in an amount in the range of from about 0.5 pounds per gallon ("ppg") to about 30 ppg by volume of the treating fluid.

The treating fluids described herein optionally may include one or more of a variety of well-known additives, such as surfactants, de-emulsifiers, scale inhibitors, corrosion inhibitors, catalysts, clay stabilizers, biocides, bactericides, friction reducers, gases, foaming agents, iron control agents, solubilizers, pH adjusting agents (e.g., buffers), and the like. For example, in some embodiments, it may be desired to foam a treating fluid using a gas, such as air, nitrogen, or carbon dioxide. Those of ordinary skill in the art, with the benefit of this disclosure, will be able to determine the appropriate additives for a particular application.

A person skilled in the art with the benefit of this disclosure could prepare cocrystals suitable for use in fracturing operations and could prepare fracturing fluids including the cocrystals. There are several known methods for forming cocrystals. In one embodiment a cocrystal may be formed by grinding the active agent and any coformer(s). The grinding may be accomplished by liquid assisted grinding, whereby the solids are ground with solvent, such as in an agate mill. In another embodiment, a cocrystal may be formed by dissolving the active agent and any coformer(s) in solvent and allowing the solvent to slowly evaporate. In still another embodiment a cocrystal may be formed by dissolving the active agent and any coformer(s) into hot solvent and allowing the solvent to cool, such that the cocrystal precipitates.

More particularly, in one embodiment a cocrystal may be formed by determining the solubility of a breaker, such as sodium persulfate, in a range of solvents; pairing that breaker with different coformers that will interact with the breaker, such as by hydrogen bonding or other intermolecular interaction; and combining breaker and coformer in different ratios using one of the methods described above. The crystalline materials formed provide cocrystals with a range of solubilities.

The solubilities of the multicomponent materials described herein can be manipulated both by changing the identity of the breaker and/or coformer and by changing the ratio in which the breaker and coformer are combined. A cocrystal should be selected that has the appropriate solubility profile, and includes an appropriate breaker, for a desired fracturing application. While a certain amount of screening is required to identify an optimum combination of breaker and coformer, such screening would be routine to one skilled in the art with the benefit of this disclosure.

An advantage to using the multicomponent materials described herein is that physical properties, such as solubility, can be tuned without compromising the structure of the breaker molecule or its intended function. Cocrystallization relies on intermolecular interactions such as hydrogen bonding, so no covalent bonds are formed or broken. Thus, the chemical identities of the individual molecules do not change.

The compositions described herein may be used in any subterranean operation wherein a fluid may be used. Suitable subterranean operations may include, but are not limited to, drilling operations, hydraulic fracturing treatments, sand control treatments (e.g., gravel packing), acidizing treatments (e.g., matrix acidizing or fracture acidizing), "frack-pack" treatments, well bore clean-out treatments, and other suitable operations where a treating fluid as disclosed herein may be useful.

In one embodiment, a method of treating a subterranean formation includes introducing a treating fluid into the subterranean formation at a rate and pressure sufficient to create or enhance one or more fractures therein, wherein the treating fluid is any fluid disclosed herein, or an equivalent thereof. In some embodiments, the treating fluid includes a polymer and a cocrystal, and the cocrystal includes at least one breaker and at least one coformer. In some embodiments, the at least one coformer is also a breaker. In some embodiments, the cocrystal includes any breaker described herein, or equivalent thereof, cocrystallized with any coformer described herein, or equivalent thereof. In some embodiments, the breaker is a persulfate salt, a perborate salt, a perchlorate salt, or equivalent thereof. In some embodiments, the breaker is sodium persulfate, ammonium persulfate, or sodium perborate. In some embodiments, the coformer is a molecule having a functional group selected from the group consisting of carboxylic acids, amines, amides, and nitriles. In some embodiments, the cocrystal is soluble in the treating fluid. In some embodiments, the treating fluid is aqueous.

In some embodiments, the polymer in the treating fluid is, or includes, a polysaccharide or a derivative or equivalent thereof. In some embodiments, the polysaccharide is cellulose, guar gum, chitosan, hyaluronic acid, xanthan, derivatives thereof, or equivalents thereof. The polymer may be a copolymer or blend. In some embodiments, the polymer is crosslinked.

The compositions and methods of the appended claims are not limited in scope by the specific compositions and methods described herein, which are intended as illustrations of a few aspects of the claims and any compositions and methods that are functionally equivalent are within the scope of this disclosure. Various modifications of the compositions and methods in addition to those shown and described herein are intended to fall within the scope of the appended claims. Further, while only certain representative compositions and methods, and aspects of these compositions and methods are specifically described, other compositions and methods and combinations of various features of the compositions and methods are intended to fall within the scope of the appended claims, even if not specifically recited. Thus, a combination of steps, elements, components, or constituents may be explicitly mentioned herein; however, all other combinations of steps, elements, components, and constituents are included, even though not explicitly stated.

What is claimed is:

1. A method of treating a subterranean formation comprising introducing a treating fluid into the subterranean formation at a rate and pressure sufficient to create or enhance one or more fractures therein, wherein the treating fluid comprises a polymer and a cocrystal, wherein the cocrystal comprises at least one breaker and at least one coformer, wherein the at least one breaker comprises a perfluorate salt or a perchlorate salt.

2. The method of claim 1, wherein the cocrystal is soluble in the treating fluid.

3. The method of claim 1, wherein the treating fluid is aqueous.

4. The method of claim 1, wherein the coformer comprises a functional group selected from the group consisting of aromatic acids, amines, amides, and nitriles.

5. The method of claim 1, wherein the at least one coformer comprises a second breaker.

6. The method of claim 1, wherein the polymer comprises a polysaccharide.

7. The method of claim 1, wherein the polymer is crosslinked.

8. The method of claim 1, wherein the treating fluid further comprises a crosslinker.

9. The method of claim 1, wherein the treating fluid further comprises a proppant.

10. A composition for treating a subterranean formation comprising a polymer and a cocrystal, wherein the cocrystal comprises at least one breaker selected from the group consisting of perchlorate salts and perfluorate salts and at least one coformer.

11. The composition of claim 10, wherein the at least one coformer comprises a functional group selected from the group consisting of amines, amides, and nitriles.

12. The composition of claim 10, wherein the polymer comprises a polysaccharide or derivative thereof.

13. The composition of claim 12, wherein the polysaccharide is selected from the group consisting of cellulose, guar gum, chitosan, hyaluronic acid, xanthan, a derivative thereof, or a combination thereof.

14. The composition of claim 10, further comprising a proppant.

15. The composition of claim 10, wherein the polymer is crosslinked.

16. The composition of claim 10, further comprising a crosslinker.

17. A treating system used to create or enhance one or more fractures in a subterranean formation comprising a polymer and a cocrystal wherein the cocrystal comprises at least one breaker and at least one coformer, wherein the at least one breaker comprises a perfluorate salt or a perchlorate salt.

* * * * *